(12) United States Patent
Hu et al.

(10) Patent No.: US 8,572,756 B2
(45) Date of Patent: Oct. 29, 2013

(54) CAPTCHA METHOD AND SYSTEM

(75) Inventors: Hui Hu, Beijing (CN); Hao Fang, Beijing (CN); Qingyan Liu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 179 days.

(21) Appl. No.: 13/078,051

(22) Filed: Apr. 1, 2011

(65) Prior Publication Data

US 2012/0254971 A1  Oct. 4, 2012

(51) Int. Cl.
*G06F 7/02* (2006.01)

(52) U.S. Cl.
USPC ... 726/28; 726/3; 726/14; 726/27; 705/14.73; 705/55

(58) Field of Classification Search
USPC .................. 726/3, 14, 27, 28; 705/14.73, 55
See application file for complete search history.

(56) References Cited

U.S. PATENT DOCUMENTS

| | | | |
|---|---|---|---|
| 6,981,145 B1* | 12/2005 | Calvez et al. | 713/170 |
| 7,606,915 B1* | 10/2009 | Calinov et al. | 709/229 |
| 7,945,952 B1* | 5/2011 | Behforooz | 726/22 |
| 2008/0133348 A1* | 6/2008 | Reed et al. | 705/14 |
| 2010/0049695 A2* | 2/2010 | Morsa | 707/3 |

\* cited by examiner

*Primary Examiner* — Eleni Shiferaw
*Assistant Examiner* — Paul Callahan
(74) *Attorney, Agent, or Firm* — Rothwell, Figg, Ernst & Manbeck, P.C.

(57) ABSTRACT

A CAPTCHA method executed by a CAPTCHA system is provided, comprising: receiving a CAPTCHA request comprising category information of an application service from an application server; responding to the application server with a token identifying the CAPTCHA request and a CAPTCHA image comprising a distorted advertisement word associated to the category information and a series of randomly generated and distorted characters, both the advertisement word and the characters being a CAPTCHA text intended to be typed by a user via a user equipment connected to the application server; receiving from the application server the token and a CAPTCHA answer submitted from the user equipment by the user; and verifying the token and the answer and returning to the application server a result of the verification. This provides an improved CAPTCHA system and method with better advertising effects and security.

20 Claims, 6 Drawing Sheets

CAPTCHA METHOD AND SYSTEM

TECHNICAL FIELD

The invention relates to a CAPTHCA method and a system thereof.

BACKGROUND

CAPTCHA/Captcha (Completely Automated Public Turing Test to Tell Computers and Humans Apart) is a technique for challenge-response tests used in computing environment. CAPTCHAs can be deployed to protect systems vulnerable to e-mail spam and automated postings, by running a challenge-response test on the systems, for example, a user's computer or smart phone. CAPTCHA can also be used to prevent or at least make it harder for machines to automatically download files.

The process usually involves a server asking a user to complete a test which the server is able to generate and send to the user's user equipment and then, upon a reply from the user equipment, determine whether the user has inserted the right answer to the test. The test is supposed to be easy to solve for a human but not a computer. Because computers are supposed to be unable to solve the CAPTCHA, any correct solution received by the server is presumed to be originating from a human, thus distinguishing humans from computers. A common type of CAPTCHA requires that the user types in letters and/or digits displayed in a distorted image that appears on a screen before e.g. registration, downloading and login to provide a secure environment for the application service providers.

It is also known that the evolution of CAPTCHAs has led to a form of advertising/advertisement (often abbreviated as "Ad"). In essence, the core concepts and purpose of CAPTCHAs will remain unchanged. Instead of seeing a distorted image that contains generated characters, an image or video containing advertisements may be displayed.

In video-based CAPTCHA solutions, a CAPTCHA text is embedded into 5~10 seconds flash video. Users need to identify the floating CAPTCHA text in the video and input the text. A company named NuCaptcha provides this CAPTCHA solution, as can be seen via http://www.nucaptcha.com, retrieved on Feb. 23, 2011. However, there is a problem that users immediately may recognize and remember the CAPTCHA characters in the Ad video without having to and/or wanting to see the whole Ad video. Although he/she has to submit CAPTCHA answer after the video has ended, users may not like to wait for 5~10 seconds, so they may choose to skip the video by scanning other webs. Thus, the purpose of advertising will not be achieved effectively. Moreover, many user equipments cannot show videos of certain formats, e.g. flash video, simply because they lack a compatible decoder. Users of such user equipments would not be able to solve the CAPTCHA, since they could not even see the video.

Another kind of CAPTCHA advertising is based on image. In this solution, the CAPTCHA text is some words comprised in an Ad picture. These solutions usually either do not force the user to type in advertisement words or contains only advertisement without randomly generated and distorted characters. The former may make users have the chance to ignore advertisement, and the latter may be easier hacked by some Optical Character Recognition (OCR) and image recognition technologies.

Therefore, a CAPTCHA method and system with improved advertising effect and security is needed.

SUMMARY

To this end, one object of the invention is thus to provide an improved CAPTCHA method and system which may achieve better advertising effect and security.

The object is according to a first aspect of the invention achieved by providing a CAPTCHA method executed by a CAPTCHA system which comprises the steps of: receiving a CAPTCHA request comprising category information of an application service from an application server; responding to the application server with a token identifying the CAPTCHA request and a CAPTCHA image comprising a distorted advertisement word associated to the category information and a series of randomly generated and distorted characters, both the advertisement word and the characters being a CAPTCHA text intended to be typed by a user via a user equipment connected to the application server; receiving from the application server the token and a CAPTCHA answer submitted by the user; and verifying the token and the answer and returning to the application server a result of the verification.

The category information may comprise an industrial group attribute of an advertisement word provided by an advertiser or the industrial group attribute of the application service provided by an Application publisher.

The CAPTCHA image may be generated based on the industrial group attribute.

The advertisement word may be associated with the application service via the same industrial group attribute.

The method may comprise the step of allowing the Application publisher to add or delete a license for using CAPTCHA for each application service and the corresponding category information of the application service; and allowing the advertiser to add or delete the advertisement word and the corresponding category information of the advertisement word.

The CAPTCHA answer and the token may be stored in a cache, and fetched only once and removed from the cache instantly.

The token and the CAPTCHA image may be transmitted to the application server or further to the user equipment over an air interface or a physical interface.

The method may comprise the step of charging for the advertisement with different charging policies comprising bid for ranking.

The object is according to a second aspect of the invention achieved through a method for generating a CAPTCHA image by a CAPTCHA system, which comprises the steps of: obtaining an advertisement word from an advertisement database based on category information contained in a CAPTCHA request; generating a first CAPTCHA image with a series of randomly generated and distorted characters; and generating a resultant CAPTCHA image by comprising a distorted advertisement word and the first CAPTCHA image, both the advertisement word and the characters being a CAPTCHA text intended to be typed by a user via a user equipment connected to an application server.

The object is according to a third aspect of the invention further achieved through a CAPTCHA system, which comprises a database configured to provide information comprising an advertisement word; and a CAPTCHA processing unit configured to receive a CAPTCHA request comprising category information of an application service from an application server; respond to the application server with a token identifying the CAPTCHA request and a CAPTCHA image comprising a distorted advertisement word associated to the category information and a series of randomly generated and distorted characters, both the advertisement word and the characters being a CAPTCHA text intended to be typed by a user via a user equipment connected to the application server; receive from the application server the token and a CAPTCHA answer submitted from the user equipment by the user; and verify the token and the answer and return to the application server a result of the verification.

The category information may comprise an industrial group attribute of an advertisement word provided by an advertiser or the industrial group attribute of the application service provided by an Application publisher.

The CAPTCHA processing unit may be configured to generate the CAPTCHA image based on the industrial group attribute.

The advertisement word may be associated with the application service via a same industrial group attribute.

The CAPTCHA answer and the token may be stored in a cache of the CAPTCHA system, and fetched only once and removed from the cache instantly after being fetched.

The CAPTCHA processing unit may be configured to allow the Application publisher to add or delete a license for using CAPTCHA for each application service and the corresponding category information of the application service; and to allow the advertiser to add or delete the advertisement word and the corresponding category information of the advertisement word.

The CAPTCHA processing unit may be configured to charge for the advertisement with different charging policies comprising bid for ranking.

The token and the CAPTCHA image may be transmitted to the application server or further to the user equipment over an air interface or a physical interface.

The object is according to a fourth aspect of the invention further achieved through a computer program product, which comprises a computer readable medium with computer executable instructions, which when executed by a CAPTCHA system causes the CAPTCHA system to perform the method of the invention described above.

The advantageous effects the invention lie in that, an efficient advertisement effects may be achieved with good security by comprising Ad Words and original CAPTCHA characters, thus it is enabled that users are required to type Ad words with a series of original randomly generated and distorted CAPTCHA characters. With an increasing number of CAPTCHA users, both publishers and advertisers may have greater commercial interests from the invention. Simultaneously, application services may be provided securely and smoothly without interruption or delay caused by some malicious programs that obstructs the use of the service for user for which the application services are intended.

BRIEF DESCRIPTION OF THE DRAWINGS

The features and advantages of the invention will be more apparent from the following exemplary embodiments of the invention illustrated with reference to the accompanied drawings, in which.

DETAILED DESCRIPTION

Embodiments of the invention will be described more fully hereinafter with reference to the accompanied drawings. It will be apparent to those skilled in the art that the invention may, however, be embodied in many different forms and should not be construed as limited to the embodiments and specific details set forth herein. Like numbers refer to like elements throughout the description.

A CAPTCHA system as described in the following requires that a user type in letters and/or digits corresponding to letters and/or digits displayed in a distorted image that appears before him on a screen and can be used for example in a web application. For safety, the user must input right characters to get a service provided by the web application. Simultaneously, the user gets a deeper impression on what he has written or typed. Thus CAPTCHA text comprising a series of randomly generated and distorted characters and a distorted advertisement word is provided.

The advertisement word comprises at least one word which is associated with a service, a product, a company, or any other objects for advertisement or business purpose. The advertisement word could therefore be, but is not limited thereto, at least a part of a company name (such as "Ericsson"), a trademark associated with a product (such as "Xperia PLAY"), a trademark associated with a technology (such as "LTE"), or a slogan associated with a company (such as "Taking you forward").

Both the randomly generated characters and the advertisement word may be distorted by any image distortion algorithm known to the skilled person, such as KCAPTCHA and is in this embodiment executed by the CAPTCHA system.

Since the distorted advertisement words act as a part of CAPTCHA text intended to be typed by users, it will be remembered by users more easily. Simultaneously, the randomly generated and distorted characters are used together with the distorted advertisement word to provide better security.

Figure 1:
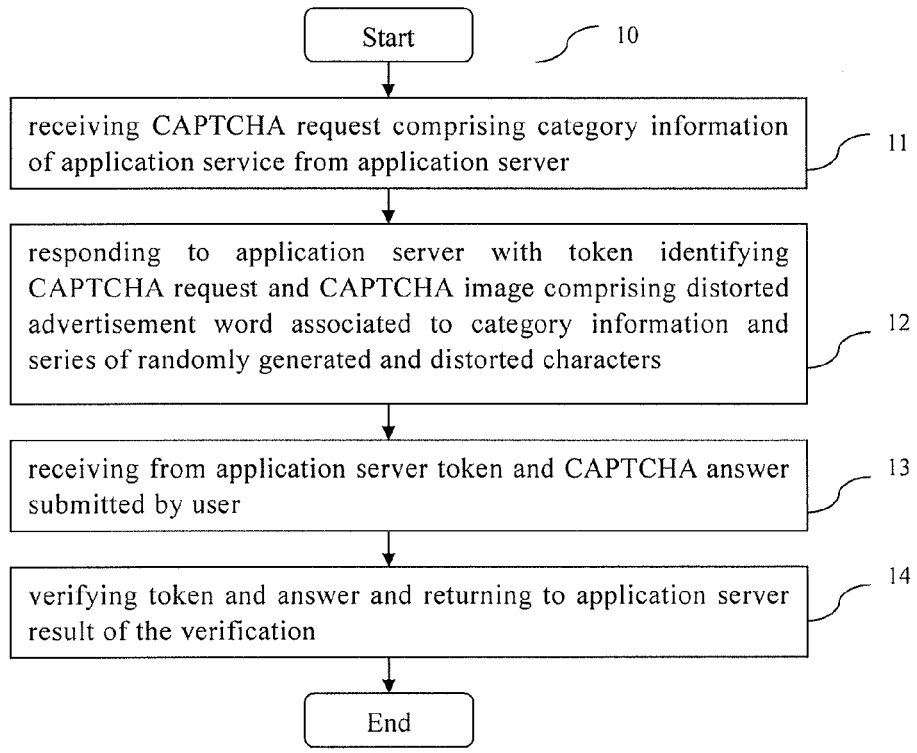
FIG. 1 illustrates a flowchart of a CAPTCHA method according to an embodiment of the invention.

FIG. 1 illustrates a flowchart of a CAPTCHA method 10 according to an embodiment of the invention.

In step 11, a CAPTCHA system receives a CAPTCHA request from for example an application server (AS).

Category information of an application service provided by the application server is contained in the request. The Category information refers to the information indicating classification of the application service provided by the application server, and the Category information may be defined by an application publisher. The Category information contains industrial group attributes. The Industrial group attributes may be used for determining which industrial group different advertisement words or different application services belong to. In a broad sense, the industrial group may refer to, for example, "electronics industry", "agricultural industry", "automotive industry", "travel agent services industry", "bookstore industry", "music industry", "food industry", "fashion industry" and "airline industry". It may further refer to a group subdivided in above industrial groups according to various criterions as needed, for example, company names such as "Ericsson", "HUAWEI", "ZTE" can belong to an industrial sub group classified under "electronics industry" called for example "communication equipment manufacturers" or for example subgroups "mobile phones", "laptop", under "electronics industry" or "communication equipment manufacturers.

The CAPTCHA system may be embodied as a single or multiple networking physical devices, such as computer(s), server(s), or other computing devices connected to e.g. the Internet or an intranet that may implement the CAPTCHA and advertising functions of the invention.

In step 12, upon the request, the CAPTCHA system responds to the AS with a token and a CAPTCHA image.

The CAPTCHA image is generated by comprising a distorted advertisement word associated to the category information and a series of randomly generated and distorted characters. Both the CAPTCHA characters and the advertisement word are the CAPTCHA text intended to be typed by users via a user equipment connected to the application server. The user equipment serves as user client 21 shown in FIG. 2 and may comprise a mobile telephone, a laptop, a desktop and a tablet/slate/pad, etc.

Figure 3:
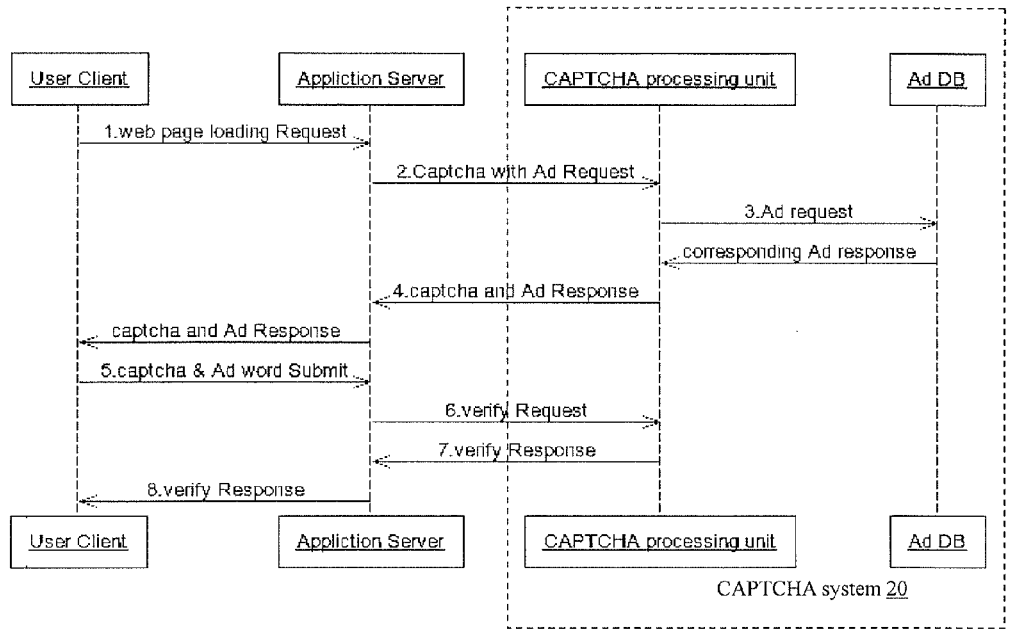
FIG. 3 illustrates a schematic diagram of a messaging flow applied in the application model of FIG. 2.

The token is a unique identifier generated by the CAPTCHA system to identify a whole interaction session including a series of requests and responses as shown in FIG. 3 established between the CAPTCHA system, Application Server, and user client. For example, the token is a 32-bit string generated by some algorithms, such as MD5, random algorithm, based on the current time in microseconds. For example, the token can be generated as a string of "22b82cbe6b7876be213162554f74cb07". The token comprises an advertisement ID number searched from a database (e.g., Ad database) based on the category information in the request. The advertisement ID number is used for searching the advertisement word from the database.

The token and the CAPTCHA image may be transmitted to the AS and further to the user equipment over an air interface or a physical interface depending on the different network environment.

In an embodiment of the invention, the CPATCHA system may provide Ads more efficiently by classifying both Application publishers and advertisers into different groups according to category information, such as industrial group attributes. In other words, the CAPTCHA image may be generated based on the industrial group attributes. With different industrial group attributes, the CAPTCHA images with different advertisements corresponding to the different industrial group will be provided to the user.

In the context, Application publishers or Publishers may be developers and application server owners/application service providers/website owners who want to use CAPTCHA in their applications or websites. Advertisers may comprise companies, institutions which want to promote their advertisement word using CAPTCHA.

The application service and the corresponding advertisement may be associated by the same industrial group attribute. When an Application publisher requests the CAPTCHA from the CAPTCHA system, the corresponding Ad in conformity with the industrial group the provided application service belongs to will be provided.

For example, an application service provides online selling of mobile phones, and it is registered with "mobile phone" industrial group in the CAPTCHA system. The Ad words of "Samsung Galaxy", "HTC Desire" and "XPERIA ARC" have also been registered with "mobile phone" industrial group. When the application server posts a CAPTCHA request, the result CAPTCHA image comprising a series of randomly generated and distorted characters and the corresponding distorted Ad words above will be provided by the CAPTCHA system.

The CAPTCHA system may allow the publishers to set different industrial group attributes for their application services, and may allow the advertisers to register their advertisement words and set their industrial group attributes. For example, a manufacturer of electronic user equipment like mobile phones and laptops may register one or more Ad words and assign each one of them to more than one industrial group attributes, like "mobile phones" and "laptops".

In step 13, the CAPTCHA system receives the token and a CAPTCHA answer submitted from the user equipment by the user via the AS.

In step 14, the CAPTCHA system verifies the CAPTCHA answer as well as the token and returning a result of the verification to the AS.

The result of the verification may be a plain string which indicates if the CAPTCHA answer from the user is correct or not. If the result is True, i.e., the CAPTCHA was successfully verified, the user will be allowed to access some service or information provided by the AS. If the result is False, i.e., the CAPTCHA was not successfully verified, the user may not be allowed to access the service or information provided by the AS. Alternatively, the user may be allowed to have a fixed number of attempts, e.g. five, to input a new CAPTCHA answer to a new CAPTCHA image sent from the CAPTCHA system. If an answer from the user has been wrong five times in a row, the service or information will be denied to be accessed by the user for a predetermined time.

Figure 2:
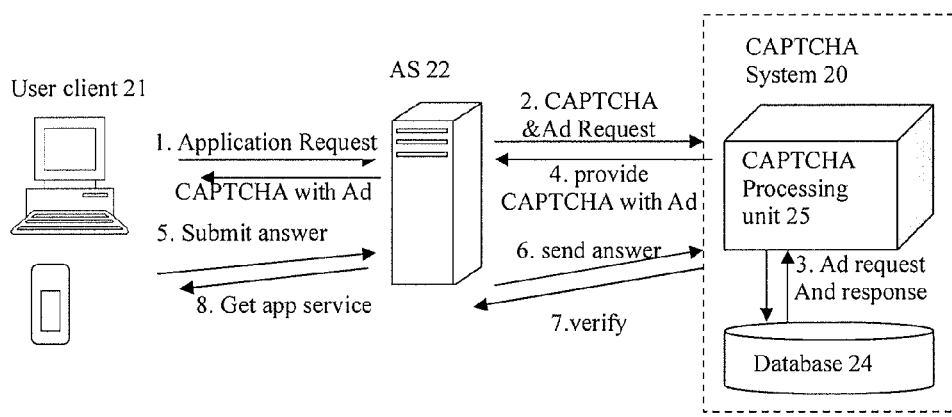
FIG. 2 illustrates a schematic diagram of an application model of the CAPTCHA method according to an embodiment of the invention.

FIG. 2 illustrates a schematic diagram of an application model of the CAPTCHA method according to an embodiment of the invention.

As an example, a Client browser running on a user equipment (serving as user client 21) requests the web page of a certain service. An application server (AS) 22 processes the request, and sends a CAPTCHA request to a CAPTCHA system 20 with advertisement functions. In the CAPTCHA system 20, a CAPTCHA processing unit 25 processes the CAPTCHA request and gets a corresponding Ad from an Ad DB 24. Then, the CAPTCHA system 20 gives back a CAPTCHA image comprising a series of randomly generated and distorted characters with a distorted Ad word, and a token which identifies this CAPTCHA request to the user equipment via the AS 22. After the client browser loads a web page with the CAPTCHA image, a user inputs CAPTCHA answer information via the user equipment and submits the answer with the token. The AS 22 sends the CAPTCHA answer with the token to the CAPTCHA system 20 for verification. When the CAPTCHA system 20 verifies the CAPTCHA answer and the token, it then responds with a result to the AS 22. The AS 22 checks the response. If it is true, i.e. the answer received from the client browser is right, generally the user will be allowed to access some service or information; otherwise, the AS 22 may for example ask the user to try again.

The AS 22 can be configured to allow a fixed number of attempts, e.g. five. If an answer from the client browser has been wrong five times in a row, the AS 22 may be configured to deny the service for the client browser for a predetermined time, e.g. ten minutes, by blocking application requests from the user equipment.

FIG. 3 illustrates a schematic diagram of a messaging flow applied in the application model of FIG. 2, which corresponds to the procedures described in FIG. 2, thus will not be described in detail again.

Below, a CAPTCHA REST API to get a CAPTCHA image is shown for illustrating the message format and related parameters as an example.

When getting a CAPTCHA image, the REQUEST FORMAT is for example an HTTP GET message having a format as indicated by the message:

http(s)://captcha.labs.ericsson.net/get?key="devkey"

The parameter "key" in the message above is a unique identifier for allowing the corresponding application publisher to use the CAPTCHA API.

The response (challenge) to the query is a string with JSON format containing the token that identifies the CAPTCHA image, e.g.:

{'token': 'String', 'image': 'String', 'verify': 'String', 'adid': 'Int', 'adurl': 'String'}

Table 1 explains the content of the response.

TABLE 1

Response Parameters

| Parameter | Value | Description |
| --- | --- | --- |
| token | String | The token that identifies the challenge. It will permanently invalid once used. |
| Image | String | The image url corresponding to the token. |
| verify | String | The verify url corresponding to the token. |
| adid | Int | The ad_id of the ad word corresponding to the challenge. |
| adurl | String | The ad_url of the ad word corresponding to the challenge. |

Figure 4:
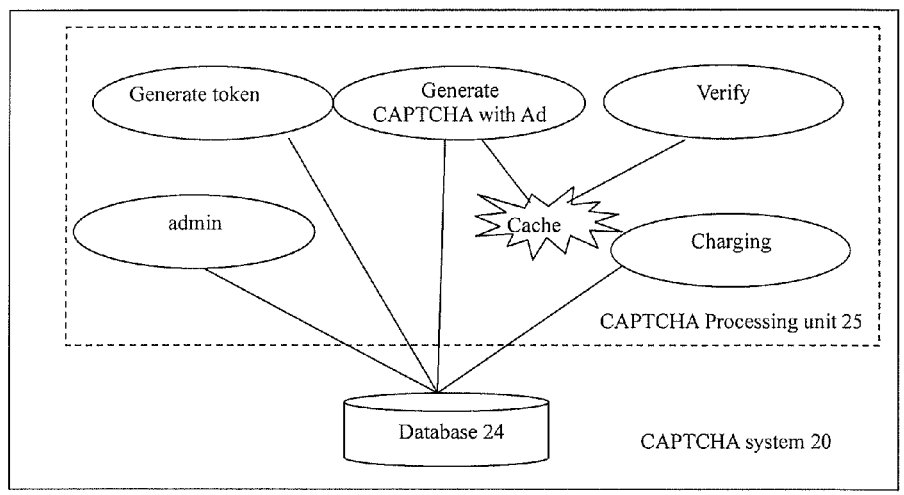
FIG. 4 illustrates a schematic diagram of function modules in a CAPTCHA system according to an embodiment of the invention.

FIG. 4 illustrates a schematic diagram of function modules comprised in the CAPTCHA system 20 according to an embodiment of the invention. In this embodiment, the CAPTCHA system may comprise a token generation module. When an AS requests a CAPTCHA, the CAPTCHA system generates the token comprising advertisement ID number which will be sent back to the AS together with the CAPTCHA image.

Figure 5:
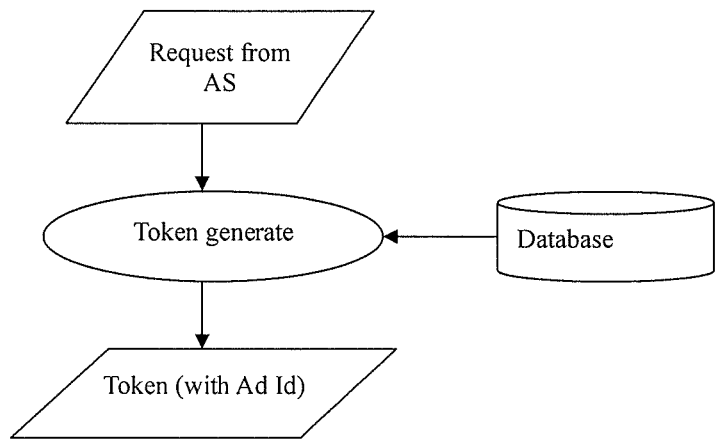
FIGS. 5, 7-9 illustrate a schematic diagram of the work flow and the output of the function modules in FIG. 4.

When the AS requests the CAPTCHA, category information (e.g., the industrial group attribute for identifying which industrial group the application service belongs to) is sent with a CAPTCHA request to the CAPTCHA system. The CAPTCHA system gets an Id number of corresponding advertisement from the database, e.g., an advertisement database containing information for advertising, by this category information. And then the CAPTCHA system generates a token with advertisement Id number which may be encrypted by some encryption algorithm such as MD5. The work flow and the output of the token generation module are shown in FIG. 5.

Returning to FIG. 4, the CAPTCHA system may further comprise a CAPTCHA image generation module which provides a resultant CAPTCHA image of the invention to the users.

Figure 6:
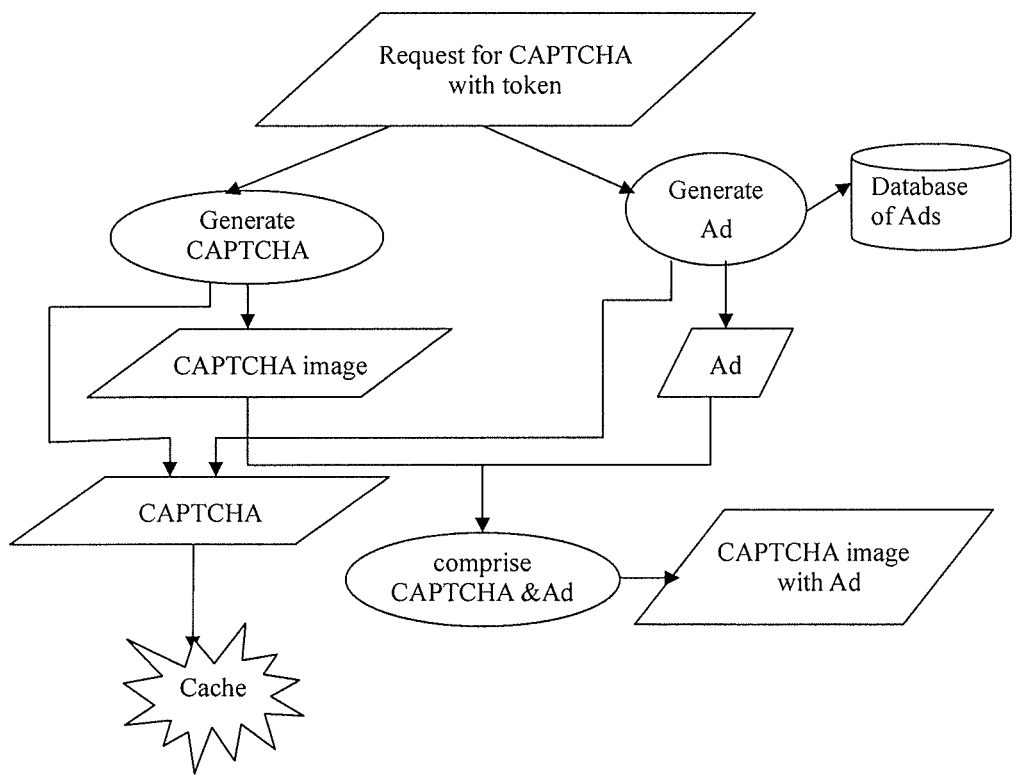
FIG. 6 illustrates a flowchart of a method for generating a CAPTCHA image according to an embodiment of the invention.
Figure 8:
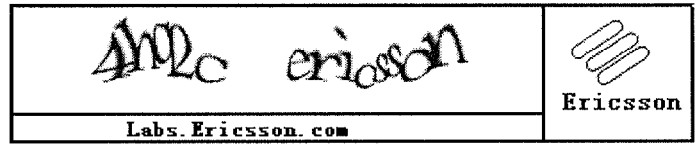

With reference to FIG. 6 showing the work flow and the output of the CAPTCHA image generation module, when a request for CAPTCHA from the application server is coming, the CAPTCHA system gets advertisement words from the Ad database 24 by Ad ID number in the token. The CAPTCHA system generates a traditional CAPTCHA image with randomly generated and distorted characters. Then, a resultant CAPTCHA image which comprises randomly generated and distorted characters and distorted Ad word will be generated, as shown in FIG. 8.

Substantially simultaneously, the CAPTCHA answer is constructed and stored in a Cache in the CAPTCHA system.

Then the resultant CAPTCHA image will be returned to the user via the AS.

Figure 7:
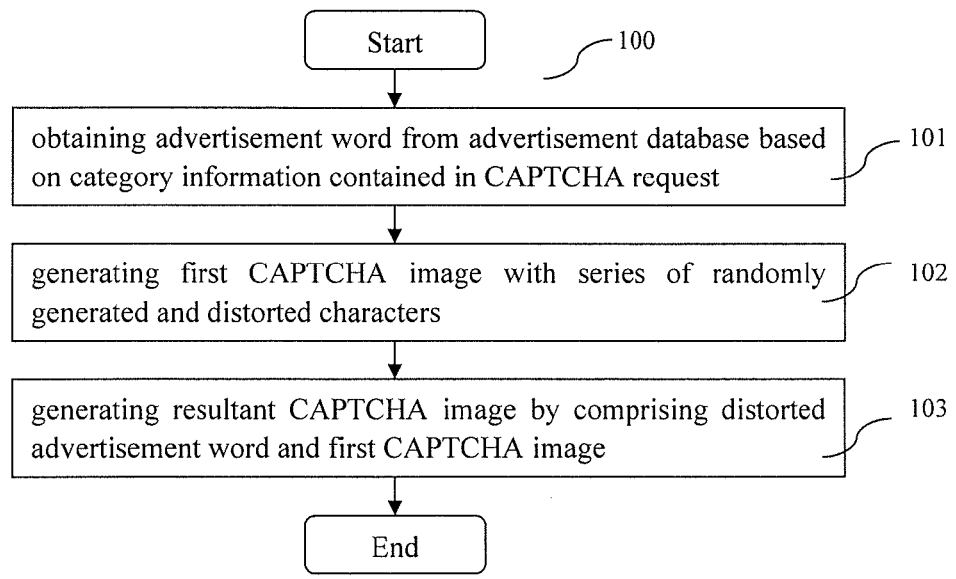

As an example, the resultant CAPTCHA image may be generated according to the method 100 shown in FIG. 7. In the method, in step 101, the CAPTCHA system obtains an advertisement word from an advertisement database based on category information contained in a CAPTCHA request. In step 102, a first CAPTCHA image with a series of randomly generated and distorted characters is generated by the CAPTCHA system. Then, in step 103, a resultant CAPTCHA image, as shown in FIG. 8, is generated by comprising a distorted advertisement word and the first CAPTCHA image containing the series of randomly generated and distorted CAPTCHA characters. Both of the advertisement word and the CAPTCHA characters are CAPTCHA text intended to be typed by users via a user equipment connected to the application server. The number of distorted characters is in FIG. 8 five, but it may of course in other embodiments be more or fewer as long as it is at least one.

With reference to FIG. 4 again, the CAPTCHA system may further comprise a verify module. When the user submits his/her answer of the resultant CAPTCHA image, together with the token, via the AS, the CAPTCHA system checks them with the answer stored in the Cache and provides a result.

Figure 9:
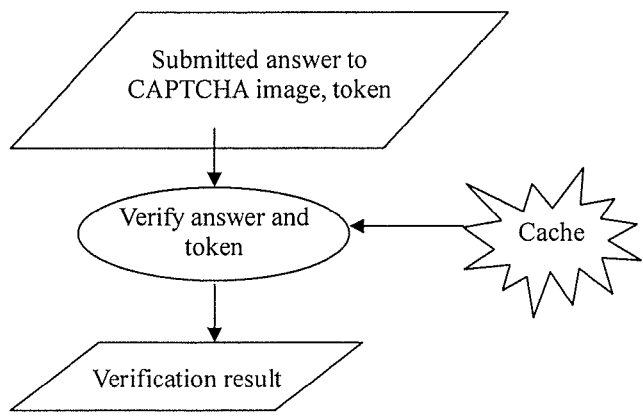

In an embodiment, with reference to FIG. 9, when the CAPTCHA system receives an answer together with the token from the AS, it will verify the token to insure the uniqueness of the CAPTCHA request, and then verify the CAPTCHA answer by the true answer stored in the cache, i.e. make a comparison of the CAPTCHA answer with the true answer. Preferably, for the security reason of avoiding back-attack, the stored answer and the token may be fetched only once and removed from the cache instantly afterwards.

In an embodiment of the invention, returning to FIG. 4 again, the CAPTCHA system may further comprise an administration module. A prologue of the procedure for advertisers and publishers may be comprised. The administration module may allow the advertisers to upload their advertisements with category information, e.g., industrial group attribute, to the database, and allow the publishers to upload their services with their category information to the database. The administration module may manage advertisements with category information uploaded by advertisers and application services with category information uploaded by Application publishers.

The administration module may further allow the publishers to add or delete a license for using CAPTCHA for each application service and the corresponding category information for the application service; and the administration module may allow the advertisers to add or delete the advertisement (such as Ad words, Ad URL, Ad image) and the corresponding category information for the advertisement.

For example, if the advertiser wants to set the industrial group attributes of his Ad words to be for example "Ericsson labs", he may choose it from the industrial group list if the industrial group attribute, "Ericsson labs" has existed in the CAPTCHA system; or, if the industrial group attribute "Ericsson labs" doesn't exist, the advertiser may create it in the CAPTCHA system. A publisher may also set the industrial group attribute of his application service for example to be "Ericsson labs", for example, in case that the application service is provided by Ericsson labs. When the application service requests CAPTCHA, the Ad words with the same industrial group "Ericsson labs" will be obtained by searching the Ad database.

In a further embodiment of the invention, returning to FIG. 4 again, the CAPTCHA system may comprise a charging module. Charging may occur when a CAPTCHA with advertising function is requested.

Several charging policies for advertising may be applied, such as Cost Per Click (CPC), Cost Per Mille (CPM) (thousand views). Also the advertisers may bid for ranking. For example, given the same industrial group attribute Ads belongs to, the higher price is given, the better chance to be advertised.

As an example, a charging mode for advertising may comprise: when the resultant CAPTCHA image is generated, which advertisement is successfully displayed to the publisher (e.g., application service or server owner) shall be recorded by the charging module; and the corresponding cash will be deducted from the prepaid account of the advertiser, according to the charging policy.

Figure 10:
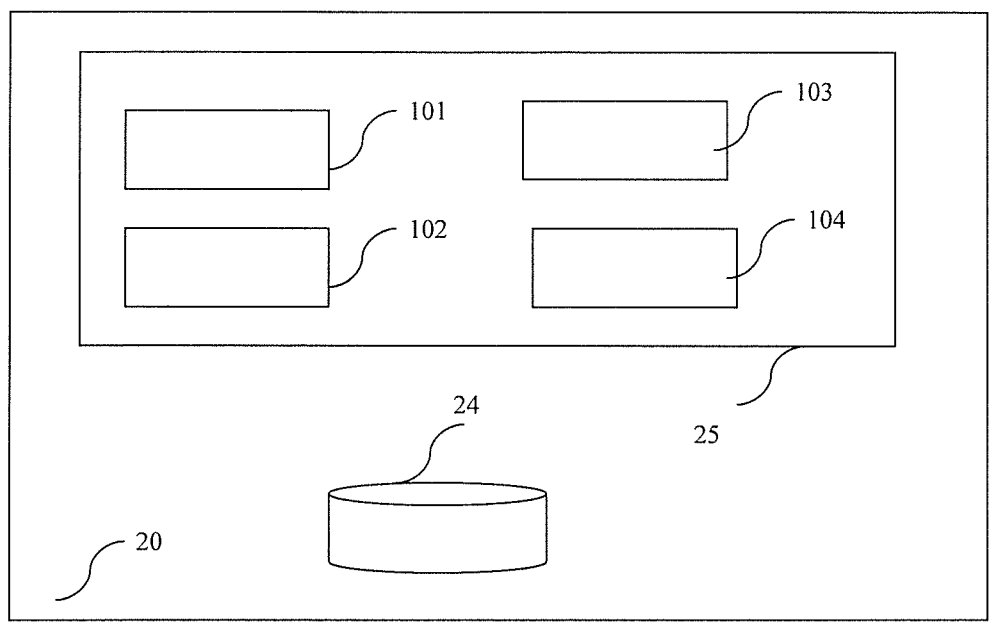
FIG. 10 illustrates a structural diagram of a CAPTCHA system according to an embodiment of the invention.

FIG. 10 illustrates a structural diagram of the CAPTCHA system 20 according to an embodiment of the invention. The CAPTCHA system 20 here comprises a database 24, e.g., an advertisement database, configured to provide information comprising advertisement words. The CAPTCHA system 20 further comprises the CAPTCHA processing unit 25. The database 24 and the CAPTCHA processing unit 25 are here implemented in single physical device, such as a server, but they may of course in another embodiment be comprised in different server hosts which communicate with each other.

The CAPTCHA processing unit 25 may further comprise a first receiving subunit 101 configured to receive a CAPTCHA request comprising category information of an application service from an application server; a responding subunit 102 configured to respond to the application server with a token identifying the CAPTCHA request and a CAPTCHA image comprising a series of randomly generated and distorted CAPTCHA characters and a distorted advertisement word associated to the category information, wherein both of the advertisement word and the CAPTCHA characters are intended to be typed by users via a user equipment connected to the application server; a second receiving subunit 103 configured to receive the token and a CAPTCHA answer submitted from the user equipment by the user; and a verify subunit 104 configured to verify the token and the answer and return to the application server a result of the verification.

The unit(s), subunit(s) or module(s) mentioned above in the embodiments may be any unit normally used for performing the involved tasks, e.g., a hardware, such as a processor with a memory, software, or the combination thereof. The unit(s), subunit(s) or module(s) may be combined differently and/or implemented as a separate module, device, or server or as a part of it.

Figure 11A:
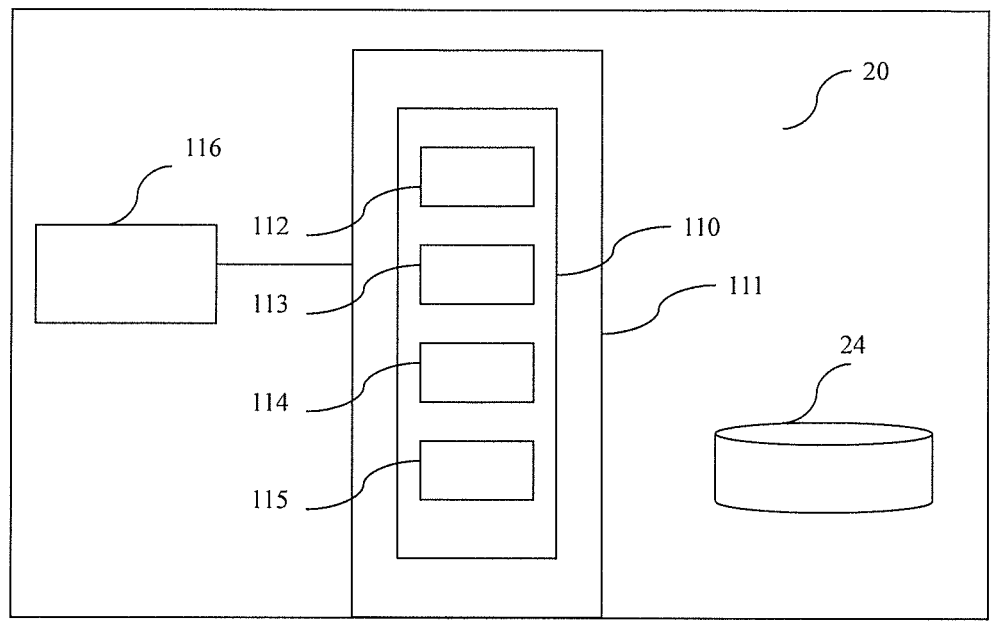
FIGS. 11a, 11b illustrate a computer program product according to an embodiment of the invention comprising a computer readable medium.

FIG. 11a illustrate a computer program product 111 according to an embodiment of the invention comprising a computer readable medium on which a computer program 110 with computer program modules 112-115 is stored.

FIG. 11a schematically illustrates an embodiment of the CAPTCHA system 20. The first receiving subunit 101, the responding subunit 102, the second receiving subunit 103, and the verify subunit 104 described above can be implemented as program modules 112-115, respectively, of a computer program 110 comprising code means which, when run by a processor 116 in the CAPTCHA system 20, causes the CAPTCHA system 20 to perform the above described functions and actions. When executed by the processor 116, the program module 112 adapts the CAPTCHA system 20 to act according to the first receiving subunit 101 for receiving a CAPTCHA request comprising category information of an application service from an application server; the program module 113 adapts the CAPTCHA system 20 to act as according to the responding subunit 102 for responding to the application server with a token identifying the CAPTCHA request and a CAPTCHA image comprising a series of randomly generated and distorted CAPTCHA characters and a distorted advertisement word associated to the category information, wherein both of the advertisement word and the CAPTCHA characters are intended to be typed by users via a user equipment connected to the application server; the program module 114 adapts the CAPTCHA system 20 to act as according to the second receiving subunit 103 for receiving from the application server the token and a CAPTCHA answer submitted from the user equipment by the user; and the program module 115 adapts the CAPTCHA system 20 to act according to the verify subunit 104 for verifying the token and the answer and returning to the application server a result of the verification.

Figure 11B:
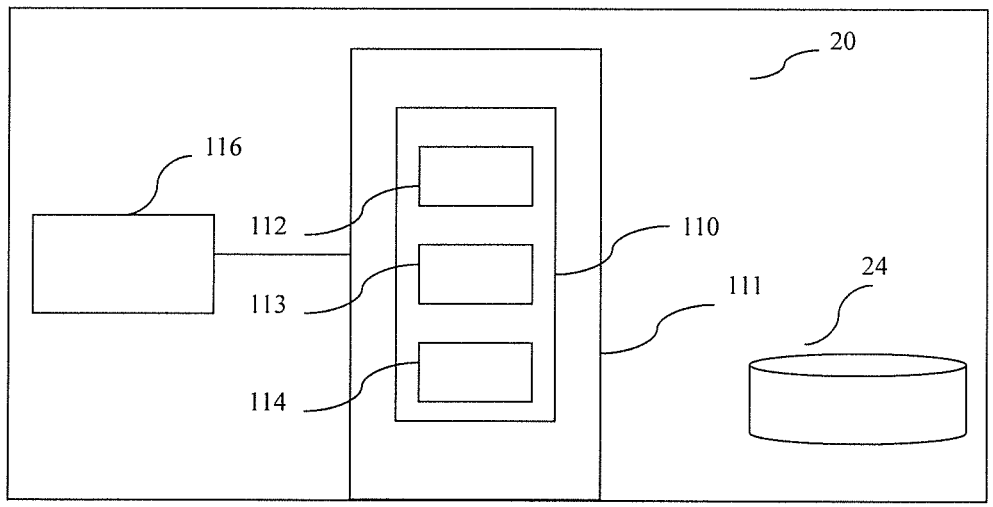

In another embodiment of the invention, as shown in FIG. 11b, the computer program 110 with program modules 112-114 may also comprise computer executable code which when run by the processor 116 causes the CAPTCHA system 20 to implement respectively some functions or actions. For example, when executed by the processor 116, the program module 112 adapts the CAPTCHA system 20 to obtain an advertisement word from an advertisement database based on category information contained in a CAPTCHA request. The program module 113 adapts the CAPTCHA system 20 to generate a first CAPTCHA image with a series of randomly generated and distorted characters. The program module 114 adapts the CAPTCHA system 20 to generate a resultant CAPTCHA image by comprising the first CAPTCHA image and the distorted advertisement word which, together with the series of randomly generated and distorted characters, is a CAPTCHA text intended to be typed by users via a user equipment connected to the application server.

The processor 116 may not only be implemented as a single Central Processing Unit (CPU), but also two or more processing components inside the CAPTCHA system. For example, the processor may comprise general purpose microprocessors, instruction set processors and/or related chips sets and/or special purpose microprocessors, such as ASICs (application specific integrated circuits). The processor 116 may also comprise a board memory for caching purposes. The computer program 110 may be carried by a computer program product 111 in the CAPTCHA system 20 connected to the processor 116. The computer program product 111 comprises a computer readable medium on which the computer program 110 is stored. For example, the computer program product 110 may be a flash memory, a RAM (Random-access memory), ROM (Read-Only memory) or an EEPROM (Electrically Erasable Programmable ROM). The computer program modules described above could in alternative embodiments be distributed on different computer program products comprising memories within the CAPTCHA system 20. The computer program product 111 may embodied as a computer readable medium such as an optical disc (such as a CD (compact disc), a DVD (digital versatile disc), a Blu-Ray disc) or other storage mediums.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and/or functionally distributed between different units and processors.

The terminology used herein is for the purpose of describing particular embodiments only and is not intended to limit to the invention. As used herein, the singular forms "a", "an" and "the" are intended to comprise the plural forms as well, unless otherwise stated. It will be further understood that the terms "comprising", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. A CAPTCHA method executed by a CAPTCHA system, comprising:
   receiving a CAPTCHA request comprising category information of an application service from an application server;
   responding to the application server with a token identifying the CAPTCHA request and a CAPTCHA image comprising a distorted advertisement word associated to the category information and a series of randomly generated and distorted characters, both the advertisement word and the characters being a CAPTCHA text intended to be typed by a user via a user equipment connected to the application server;
   receiving from the application server the token and a CAPTCHA answer submitted by the user; and
   verifying the token and the answer and returning to the application server a result of the verification.

2. The method according to claim 1, wherein the category information comprises an industrial group attribute of an advertisement word provided by an advertiser or the industrial group attribute of the application service provided by an Application publisher.

3. The method according to claim 2, wherein the CAPTCHA image is generated based on the industrial group attribute.

4. The method according to claim 3, wherein the advertisement word is associated with the application service via the same industrial group attribute.

5. The method according to claim 1, further comprising:
   allowing the Application publisher to add or delete a license for using CAPTCHA for each application service and the corresponding category information of the application service; and
   allowing the advertiser to add or delete the advertisement word and the corresponding category information of the advertisement word.

6. The method according to claim 1, wherein the CAPTCHA answer and the token are stored in a cache in the CAPTCHA system, and fetched only once and removed from the cache instantly after being fetched.

7. The method according to claim 1, wherein the token and the CAPTCHA image are transmitted to the application server or further to the user equipment over an air interface or a physical interface.

8. The method according to claim 1, further comprising:
   charging for advertisement with different charging policies comprising a bid for ranking.

9. The method according to claim 1, further comprising:
   receiving, at the application server, a request for a web document from a client browser;
   in response to receiving the request for the web page, transmitting, from the application server to the CAPTCHA system, the CAPTCHA request comprising the category information;
   receiving, at the application server, said token and said CAPTCHA image; and
   after receiving the CAPTCHA image, transmitting to the client browser the requested web document, wherein the web document causes the browser to display the CAPTCHA image.

10. The method of claim 1, wherein
   the token identifying the CAPTCHA request and the CAPTCHA image comprises: (a) a first string identifying the CAPTCHA request and (b) a second string identifying the CAPTCHA image, wherein the second string is in the form of a uniform resource locator (URL), and
   the category information comprises an identifier identifying an industry group.

11. A CAPTCHA system comprising:
   a database configured to provide information comprising an advertisement word; and
   a CAPTCHA processing unit comprising a processor configured to receive a CAPTCHA request comprising category information of an application service from an application server; respond to the application server with a token identifying the CAPTCHA request and a CAPTCHA image comprising a distorted advertisement word associated to the category information and a series of randomly generated and distorted characters, both the advertisement word and the characters being a CAPTCHA text intended to be typed by a user via a user equipment connected to the application server; receive from the application server the token and a CAPTCHA answer submitted from the user equipment by the user; and verify the token and the answer and return to the application server a result of the verification.

12. The CAPTCHA system according to claim 11, wherein the category information comprises an industrial group attribute of an advertisement word provided by an advertiser or the industrial group attribute of the application service provided by an Application publisher.

13. The CAPTCHA system according to claim 12, wherein the CAPTCHA processing unit is further configured to generate the CAPTCHA image based on the industrial group attribute.

14. The CAPTCHA system according to claim 12, wherein the advertisement word is associated with the application service via a same industrial group attribute.

15. The CAPTCHA system according to claim 11, wherein the CAPTCHA answer and the token are stored in a cache in the CAPTCHA system, and fetched only once and removed from the cache instantly after being fetched.

16. The CAPTCHA system according to claim 11, wherein the CAPTCHA processing unit is further configured to allow the Application publisher to add or delete a license for using CAPTCHA for each application service and the corresponding category information of the application service; and to allow the advertiser to add or delete the advertisement word and the corresponding category information of the advertisement word.

17. The CAPTCHA system according to claim 11, wherein the CAPTCHA processing unit is further configured to charge for the advertisement with different charging policies comprising a bid for ranking.

18. The CAPTCHA system according to claim 11, wherein the token and the CAPTCHA image are transmitted to the application server or further to the user equipment over an air interface or a physical interface.

19. A computer program product comprising a non-transitory computer readable medium with computer executable instructions, which when executed by a CAPTCHA system causes the CAPTCHA system to perform the method of claim 1.

20. A CAPTCHA apparatus, the CAPTCHA apparatus comprising a processor implemented at least partially in hardware and configured such that:

in response to the CAPTCHA apparatus receiving a CAPTCHA request comprising category information of an application service from an application server, the processor responds to the application server with a token identifying the CAPTCHA request and a CAPTCHA image comprising a distorted advertisement word associated to the category information and a series of randomly generated and distorted characters, both the advertisement word and the characters being a CAPTCHA text intended to be typed by a user via a user equipment connected to the application server; and in response to the CAPTCHA apparatus receiving from the application server the token and a CAPTCHA answer submitted by the user, the processor verifies the token and the answer and returns to the application server a result of the verification.

* * * * *